United States Patent [19]

Bate et al.

[11] 4,177,442
[45] Dec. 4, 1979

[54] PRODUCTION OF MAGNETIC MEDIA

[75] Inventors: Geoffrey Bate; Larry P. Dunn, both of Boulder County, Colo.

[73] Assignee: International Business Machines Corporation, Armonk, N.Y.

[21] Appl. No.: 836,823

[22] Filed: Sep. 26, 1977

Related U.S. Application Data

[63] Continuation-in-part of Ser. No. 609,113, Aug. 29, 1975, abandoned.

[51] Int. Cl.² .............................................. H01F 10/02
[52] U.S. Cl. ........................................ 335/284; 427/48
[58] Field of Search ................................... 427/47–48, 427/127–132; 335/284

[56] References Cited
U.S. PATENT DOCUMENTS 4,003,336   1/1977   Koester et al. ...................... 335/284

FOREIGN PATENT DOCUMENTS 1155413   7/1969   United Kingdom .

Primary Examiner—Bernard D. Pianalto
Attorney, Agent, or Firm—William N. Hogg

[57] ABSTRACT

A permanent magnet orients magnetic particles on a tape in a desired direction along the tape length (or, by rotating the magnet structure, at any desired angle to the tape length) while the tape moves past the magnet's gap. The magnet's poles are asymmetric about a time drawn through the gap center and perpendicular to the medium to first present an unfocused low intensity magnetic field to the tape followed by a narrowly focused high intensity field in the opposite direction, which latter field aligns a large proportion of the particles along desired parallel lines. Antennae attached to the pole pieces dissipate any additional undesired fields which might adversely affect the particle alignment achieved by the high intensity field.

4 Claims, 7 Drawing Figures

PRODUCTION OF MAGNETIC MEDIA

BACKGROUND OF THE INVENTION

This application is a continuation-in-part of Ser. No. 609,113, Aug. 29, 1975 and now abandoned.

FIELD OF THE INVENTION

The invention relates to a method for producing magnetic media and a magnet used in the method.

DESCRIPTION OF THE PRIOR ART

An ideal magnetic medium's particles are all uniformly oriented along parallel lines. During production of the medium, orientation is achieved by subjecting the particles to a magnetic field usually in connection with the drying of a liquid dispersion or the application of heat. If the particles are all subjected to a uniform magnetic field and if they are free to move physically, they will in turn all become uniformly oriented along parallel lines. However, this ideal situation has been difficult to achieve in a manufacturing environment.

In mass production of magnetic tape media, the tape is moved through the field of a magnet intended to orient magnetic particles on the media surface. Permanent magnets are preferred for this purpose because they are safer than electromagnets in the presence of flammable gases, they require no current, and are easier to maintain. Permanent magnets heretofore used for this purpose have provided magnetic fields capable of orienting substantial numbers of particles in the desired direction. However, new media require a greater degree of orientation, and any medium's performance may be improved by increasing the relative number of particles that are oriented in a predetermined desirable direction.

This goal is difficult to achieve with a permanent magnet because the line integral $H \cdot dl$ around a closed path is zero. This means that a tape moving past a permanent magnet used be exposed to an undesired field, whose line integral is equal and opposite to that of the desired field, tending to destroy the orientation created by the desired field. A fair degree of uniform particle orientation can be obtained by having the undesired field affect the particles only before the desired field and not at all after. This requires that the desired field be sharply focused to high field intensities while the undesired field only occurs upstream and even there is dissipated over a greater distance at lower intensities. Ideally the undesired field exerts no effect whatsoever on the medium after the medium is exposed to the desired field. See NATURE, "Magnetic Dispersions", R. R. Pierce, (E.M.I.) England, Volume 212, Page 1566, 1966.

Also, it is necessary to keep vertical field components following the orientation field as close to zero as possible to avoid disorientation or even perpendicular orientation by any vertical component.

The prior art discloses few permanent magnets having even acceptable characteristics for somewhat uniformly orienting magnetic particles or media. Electromagnet solenoids ideally exhibit fields having only unidirectional components, but all known permanent magnets used for media orientation detrimentally exhibit some significant undesirably directed fields to which a magnetic tape medium would be exposed following particle orientation by a desirably oriented field. One known permanent magnet used for orienting magnetic particles on tape provides a high intensity field in the desired direction of about 1200 oersteds with an upstream undesired field having a maximum magnitude of about $-100$ oersteds. However, the especially deleterious downstream maximum field of about $-75$ oersteds incorrectly reorients many particles. The pole pieces are symmetric and include two short downstream antennae. This would lead to equal upstream and downstream values of the undesired field were it not for the tendency of the antennae to somewhat reduce the downstream value. Asymmetric pole pieces in a permanent magnet are suggested by FIG. 9 of Speed U.S. Pat. No. 2,796,359, filed July 5, 1952, for the production of magnetic sound recording tape. The longer pole is placed upstream so that the most effective orientation of the magnetic particles will occur at the trailing (downstream) edge of the shorter pole. Analysis of the magnet described in this patent indicates that a first sharply focused field will orient the particles along desired lines, but that many of the same particles will thereafter be disoriented by the rather large second field at the short pole. The field at the long pole is small and has little effect on the ultimate alignment of the particles.

It should be noted that the fields depicted actually are fields on the path of travel of the medium which path is parallel to the plane of the paper. However, the fields are drawn as conventionally graphed on paper with a positive magnetic field being shown above the line and a negative magnetic field being shown below the line. This is by convention and does not indicate that the field is normal to the path of travel and of the medium. The vertical field components are not shown, but will be discussed infra.

SUMMARY OF THE INVENTION

Applicants have achieved a major improvement in the orientation of particles during the production of magnetic media by reversing the direction of media motion taught in the prior art. By passing the media past a short pole of an asymmetric magnetic first and then exiting the media through antennae associated with a long pole, significant performance improvements closely approaching those of a solenoid electromagnet are obtained. For example, a 1500 oersted desired field following a field in the range of $-300$ to $-400$ oersteds has been obtained while maintaining the downstream undesired field at less than $-5$ oersteds.

The foregoing and other objects, features and advantages of the invention will be appaent from preferred embodiments of the invention, as illustrated in the accompanying drawings.

IN THE DRAWINGS

DESCRIPTION OF THE PREFERRED EMBODIMENTS

Figure 1:
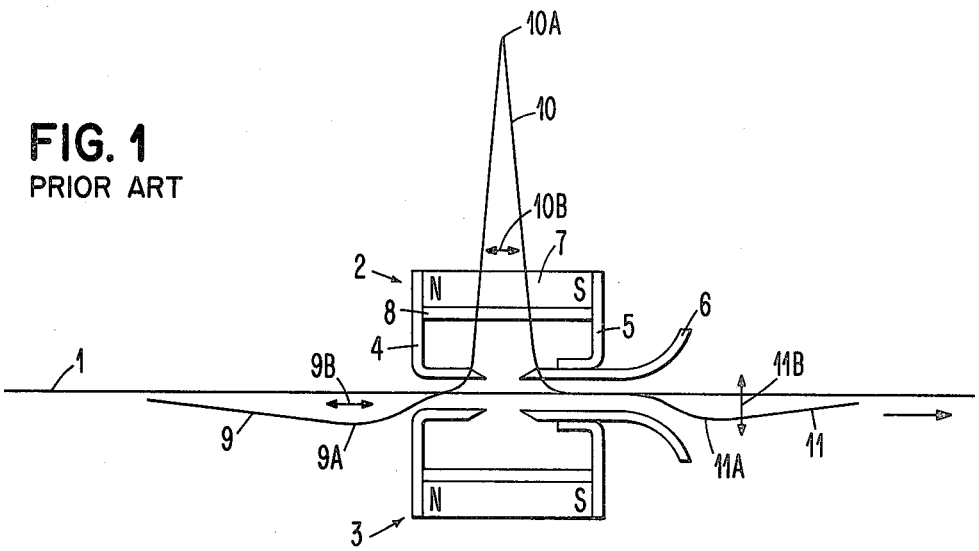
FIG. 1 is a permanent magnet known in the prior art for aligning particles on magnetic tape.

Referring to FIG. 1, there is shown a magnetic media 1, for example tape, having magnetic particles in a dispersion on a substrate as is well known in the art. During the manufacture of the medium 1, it is necessary to align the magnetic particles in a preferred direction and then maintain that alignment for subsequent ue of the medium. Among the methods for obtaining this alignment is the generation of a magnetic field which orients the particles on the medium 1 substrate while the dispersion is in the liquid form. Then, when the liquid hardens to a solid form, the particles are retained in their aligned positions. An alternative method is to heat the medium 1 prior to the application of a magnetic field in order to permit the particles to align themselves with the field until the heat is removed and the medium 1 cools to fix the particles in position.

The medium 1 moves through two prior art permanent magnets 2 and 3 in the direction shown the heavy single-headed arrow. The permanent magnet 2, which is identical to the permanent magnet 3, comprises two poles 4 and 5 and a relatively short antenna 6 which due to its placement extends the pole 5 to the same distance from the medium 1 as pole 4. A magnetic material 7 such as Alnico V is placed between the poles 4, 5 and the antenna 6 which may be constructed of a soft iron. A nonmagnetic support 8 completes the structure. The field generated by the magnets 2 and 3 is shown by the diagram forming part of FIG. 1. A negative upstream field 9, generated by the permanent magnets having north and south poles N and S as indicated, will have a peak value shown at point 9A, which tends to align particles on the magnetic medium 1 along the directions shown by the arrows 9B. A much larger positive field 10 having peak value 10A is generated by the gap between the pole pieces and is sharply focused as shown, causing alignment of particles on the magnetic medium 1 along the directions of the arrows 10B. An additional field 11 has a peak value 11A, but an effect on the particles so as to undesirably rotate them perpendicularly to the desired direction, as shown by the arrows 11B and thus reducing the degree of orientation conferred by the magnet. It should be noted that field 11 is sufficiently strong to cause a disorientation of the particles following their orientation by field 10, but it is not sufficiently strong to orient the particles in its own right.

The closed line integral of the field of a permanent magnet, such as the one shown in FIG. 1, must be zero. This is expressed by the relationship $\oint H \cdot dl = 0$, where H is the magnetic field intensity in oersteds and $l$ is the axial distance along the direction of tape motion in centimeters. Thus, the area under the curve 10 having the desired directional orientation 10B must equal the areas defined by the curves 9 and 11, the effect of the field in region 11 being to destroy the orientation produced by the field at 10. The desired orientation is obtained by dispersing the downstream area defined by the curve 11 to obtain the smallest peak 11A possible. The undesired field indicated by the curve 9 upstream of tape motion can be relatively large as long as the desired, sharply focused field indicated by the curve 10 is relatively much larger. However, the particles, once aligned in the direction 10B by the field indicated by the curve 10, should not thereafter again be realigned in the perpendicular direction 11B by the field indicated by the curve 11. Therefore, it is essential that the field indicated by the curve 11 be reduced as close to zero as is possible.

Figure 2:
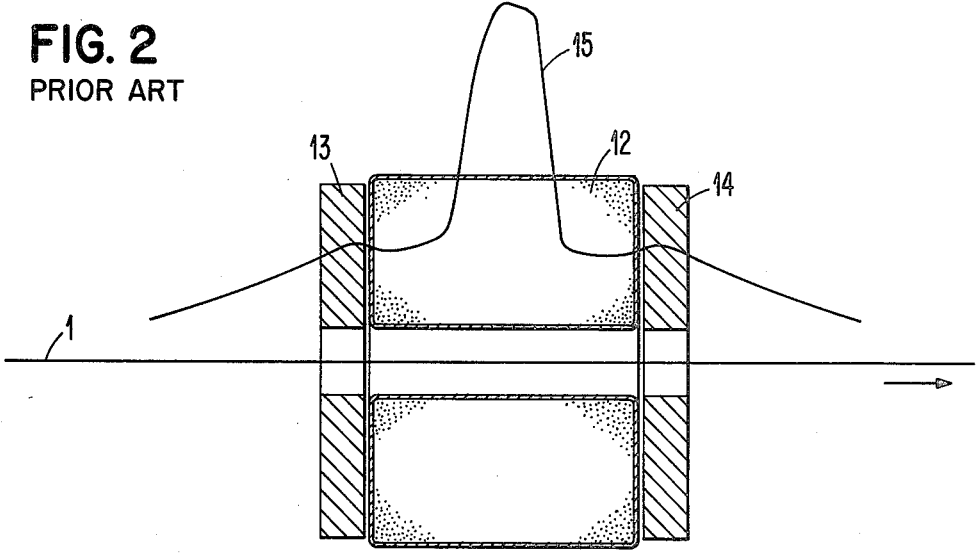
FIG. 2 is a solenoid electromagnet known in the prior art for aligning magnetic particles on magnetic tape.

Referring now to FIG. 2, tape 1 passes through an orifice in the center of a prior art solenoid electromagnetic coil 12 surrounded by nonmagnetic supports 13 and 14. In this prior art device, the area under the field curve 15 does not equal zero, because a field is generated by the solenoid in one direction only and the closed line integral $\oint H \cdot dl$ is not zero; it is in fact equal to a constant times the current in the solenoid. Therefore, there is no undesirable reorientation of particles once the coil has oriented them in a given direction. However, the solenoid coil presents the practical problem, in a manufacturing environment, of introducing the possibility of an electric spark during the presence of voltile, flammable gases. It is expensive to make and also the maintenance and accessory equipment required for an electromagnetic device is much more complex than that required for a passive permanent magnet.

Figure 3:
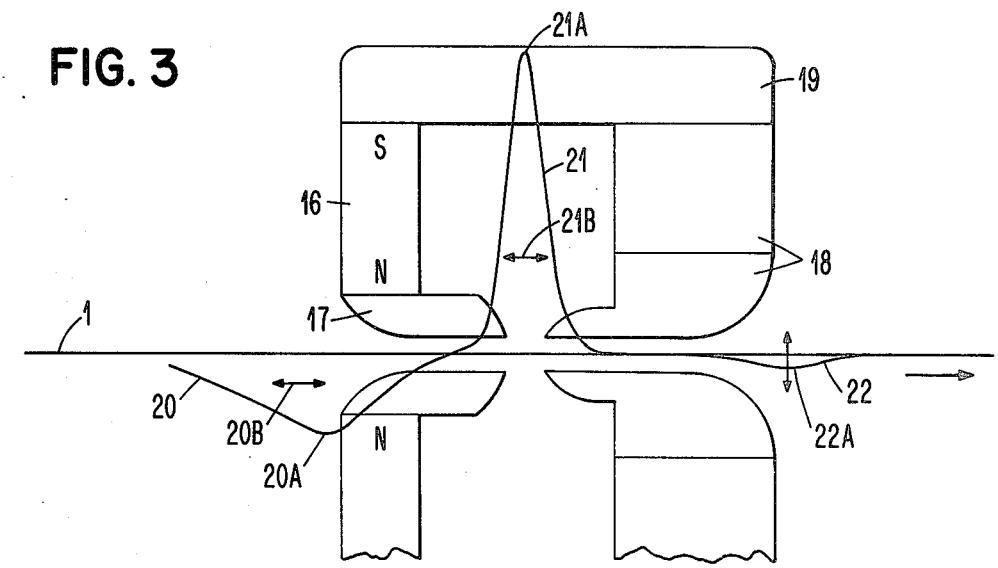
FIG. 3 illustrates the configuration of a permanent magnet usable in the invention and shows the field intensities generated thereby.

FIG. 3 shows a pair of permanent magnets usable in the inventive method disclosed herein. The magnets are identical, and each comprises a magnetic material 16 such as Alnico V or, for a different shape than shown in FIG. 3, barium ferrite. The magnetic material 16 is connected to a short pole piece 17 and to a longer pole piece 18 via a shunt 19. Components 17-19 are a permeable material such as soft iron. As the magnetic medium 1 moves in the direction of the arrow past the pair of magnets, it is exposed to the field illustrated by curves 20-22. The particles are first exposed to a relatively weak negative field but relatively stronger than the field 9A of FIG. 1 having a peak intensity 20A which tends to align particles on the magnetic medium 1 along lines indicated by the arrows 20B. Subsequently, greater particle alignment in directions 21B is achieved by a high amplitude, sharply focused field having a peak intensity 21A. The deleterious subsequent downstream disorienting field represented by curve 22 having a peak intensity 22A is minimized far below the values shown in FIG. 1 at 11A, or otherwise known in the prior art with reference to permanent magnets, due to the asymmetry of the placement of the magnetic material 16 with respect to the gap (i.e., about a line drawn through the gap center and perpendicular to the medium 1).

The asymmetry of the magnetic material 26 with respect to the gap (i.e., about a line drawn through the gap center and perpendicular to the medium), coupled with the positioning of the magnetic material on both sides of the plane of the medium 1 and providing each magnetic material with eventially the same remnant magnetization (Mr) will inherently provide the aforementioned desired minimal vertical component of the magnetic field which will be no greater in magnitude than the peak value 11A of the downstream field 11. In most cases this will be substantially less than the peak value of the field 11. This matching of the remnant magnetization can be easily accomplished since the magnetic material of each section is made up of several magnets in stacked configuration. By selecting magnets of the correct properties, an equal final structure can be provided. Thus, all disorienting effects of the assembly are minimized. It is to be understood that this minimal vertical field exists at the mid plane between the magnetic material on the opposite sides of the path of travel. On either side of this mid plane there will be increasingly greater vertical field components. Hence, it is important that the magnetic media, i.e., the magnetic particles, be maintained essentially on this mid plane as the path of travel, to keep the vertical components sensed by the medium to this minimal value.

The desirable values for the various fields are as follows:

upstream field, −200 to −600 oersteds;
orienting field, +800 to +2000 oersteds;

downstream field, −2 to −20 oersteds;
vertical field component, less than the downstream field.

Figure 4:
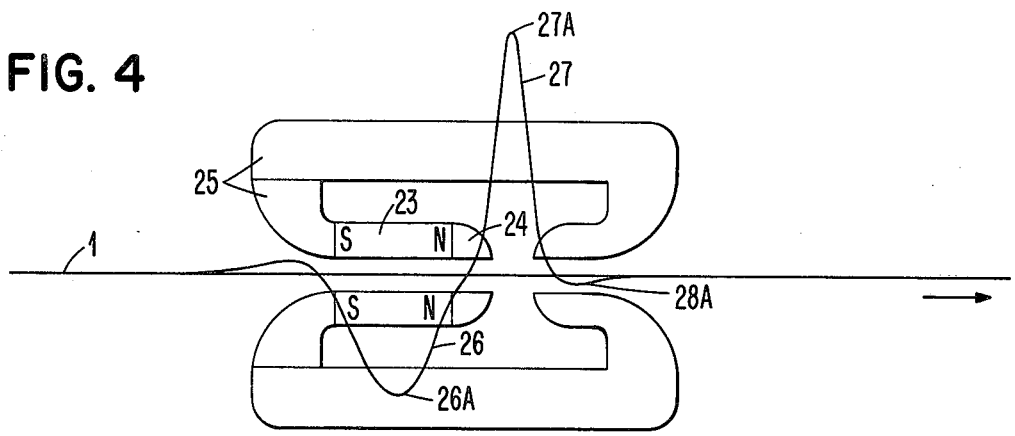
FIGS. 4–7 show different embodiments of permanent magnets usable in the invention.

FIG. 4 illustrates how a magnetic material 23 in a pair of magnets may be positioned closer to the magnetic medium 1 while retaining the advantages just described. The magnetic material 23, which may be Alnico V, is positioned between short pole 24 and a two-piece long pole 25 to give field intensities indicated by the curves 26, 27 and 28. The poles 24 and 25 may be soft iron. It will be noted that the especially undesirable downstream peak intensity 28A remains small.

Figure 5:
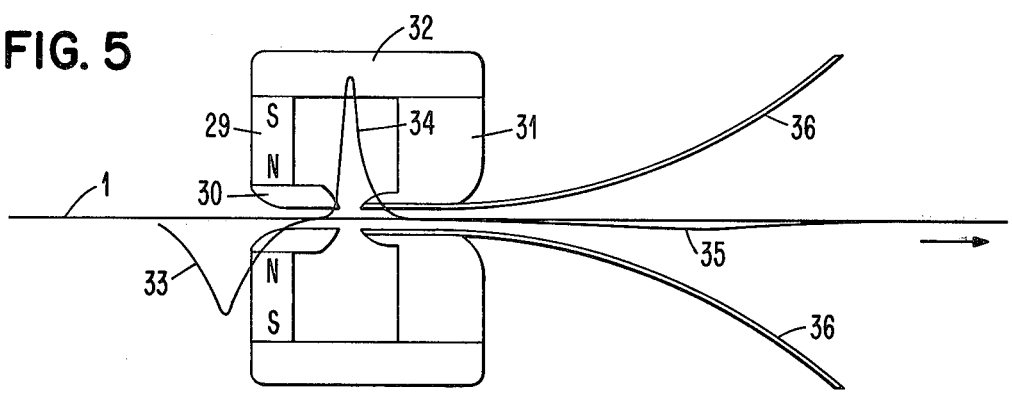
Figure 6:
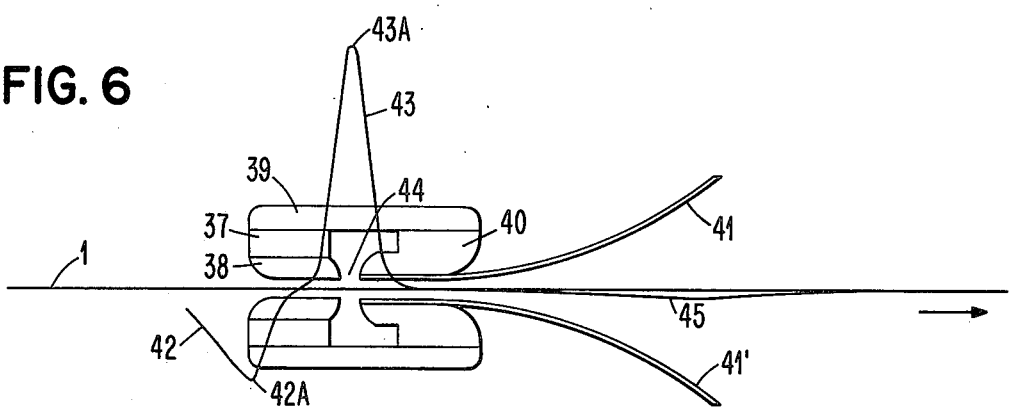
Figure 7:
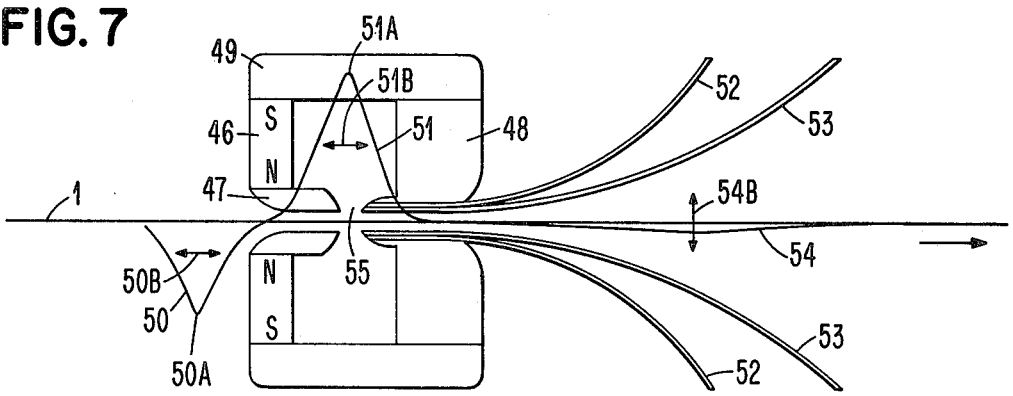

Referring now to FIG. 5, another embodiment of a pair of magnets usable in the invention is described. A magnetic material 29 such as Alnico V is associated with a soft iron short pole 30 and with a soft iron long pole 31 connected to the magnetic material via a soft iron magnetic shunt 32. The peak intensities shown by the curves 33 and 34 are otherwise similar to those already described. However, the undesirable and especially deleterious effect of the field 35 on the exit side of the magnet and downstream of the medium 1 is reduced to unusually low values by the presence of an antenna 36 connected to each of the magnets. The antenna may be constructed of a permeable material such as soft iron. Effective antennae 36 should have a length at least as great as the length of the rest of the magnet assembly without the antennae. Further, the antenna 36 tip should be roughly as far away from the tape as the shunt 32. In FIG. 6, a more compact pair of magnets than those of FIG. 5 may be obtained by using barium ferrite as the magnetic material 37. This material is most effective as a magnet when its longest side is adjacent pole 38 and shunt 39 as shown. The magnetic element 37 generates a field concentrated through short pole 38, shunt 39 and a long pole 40 to which is attached an antenna 41. As can be seen from the peak intensities 42A and 43A of the fields 42 and 43 generated at the short pole 38 and the interpole gap 44, excellent orientation of the magnetic particles is obtained. Most important, the antennae 41 and 41' restrict the downstream negative field 45 to an absolute minimum value. FIG. 7 shows the use of a permanent magnetic material such as Alnico V for the magnetic element 46 connected to a soft iron short pole 47 and to a soft iron long pole 48 via a soft iron magnetic shunt 49. The upstream negative field 50 has a maximum intensity 50A, while the sharply focused desirable orienting field 51 has a maximum intensity 51A. Two antennae, 52 and 53, on each magnet restrict the undesired downstream negative field to a very low value.

Even with these low downstream values created by the antennae, still the vertical field component will be less than the peak value 11B of these downstream fields 11.

The practice of the invention will be illustrated with reference to the magnets shown in FIG. 7. The magnetic medium 1 moves past the pairs of magnets to expose its particles to the fields 50, 51 and 54, in that order, while the particles are suspended in a liquid on a substrate forming the medium 1. As the medium 1 moves in the direction of the arrow, particles are first exposed to the negative upstream field 50 having a peak intensity 50A which aligns some of the particles; but, due to its value, not all particles are thus aligned. The particles are next exposed to the positive field 51 generated by the interpole gap 55 and having a peak value 51A. This field 51 is intense enough to align essentially all of the particles on the medium 1 along the desired directions 51B, thus correcting any misorientation caused by the previously encountered field. As the medium 1 exits the magnets, it encounters a greatly attenuated and dispersed field 54 having a peak value which is not sufficient to have any substantial disorienting effect in the directions 54B on any large numbers of particles previously aligned in the desired directions. Furthermore, the perpendicular component of the field 54 is very small.

In the previous description, reference has been made to magnetic tape 1 moving past magnets. It is not necessary that the invention be limited to the orientation of particles on magnetic tape, it being equally applicable to the orientation of magnetic particles on a substrate having any shape desired such as disks or drums. Also, it is not necessary that the medium move past a stationary set of magnets, but rather, the magnets may move past a stationary medium. While the description has referred to pairs of magnets on each side of the medium, the same effect, though somewhat attenuated, may be obtained with a single magnet.

While the invention has been particularly shown and described with reference to preferred embodiments thereof, it will be understood by those skilled in the art that various changes in form and details may be made therein without departing from the spirit and scope of the invention.

What is claimed is:

1. In a method of orienting magnetic particles on a medium during relative movement of the medium with respect to a permanent magnet assembly, the improvement comprising:

providing said magnet assembly having first and second spaced sections defining a path therebetween, each section having a large pole and a small pole with a gap therebetween and a shunt interconnecting said poles, said poles flaring outwardly at their ends away from the gap, choosing the magnets of each section to have essentially the same magnetic remanence;

arranging the magnetic material in each section entirely on the side of the small pole to create a first unfocused magnetic field at the small pole along the path of travel of the medium, a second focused magnetic field at the gap greater in intensity and opposite in the direction from the first field along the path of travel of the medium, and a third magnetic field at said larger pole; and providing antennae means on the section extending from the gap a distance at least equal to the length of the magnetic assembly said antennae means being longer than the permanent magnet alone and at one or more points being further removed from the medium than any magnetic pole to attenuate the intensity of the third field to an intensity less than that of the first field and in the same direction in the plane of the path of travel of the medium, and maintaining a minimal vertical field component normal to the plane of the path of travel no greater in magnitude than the third field by providing the magnetic material on both sides of the path of travel of the medium, and moving said media containing magnetic particles on said path through said first, second, and third fields successively, maintaining said path of travel essentially midway between said spaced sections, whereby to align the particles on a plane on said media without a substantial subsequent disorienting field.

2. The method of claim 1 wherein the maximum intensities of the fields are on the order of:
first, −200 to −600 oersteds;
second, +800 to +2000 oersteds;
third, −2 to −20 oersteds.

3. A magnetic assembly for orienting magnetic particles on a substrate moving on a plane defining a path of travel,
said assembly having first and second sections lying on opposite sides of said path of travel,
the magnetic material in each section has essentially the same remnant magnetism,
each section having a larger pole and a small pole with a gap therebetween and a shunt interconnecting said poles, said poles flaring outwardly at their ends away from said gap;
the magnetic material in each section being disposed entirely on the side of the small pole to create a first unfocused magnetic field at the small pole along the path of travel of the medium, a second focused magnetic field at the gap greater in intensity and opposite in direction from the first magnetic field along the path of travel, and a third magnetic field at said layer pole; and
antennae means on the sections extending from the ends of the sections a distance at least equal to the length of the magnetic assembly and to at least the distance of the shunt away from the path to attenuate the intensity of the third field to an intensity less than that of the first field and in the same direction in the plane of the path of travel,
and wherein the vertical field component normal to the plane of the path of travel is no greater in magnitude than the third field,
whereby to provide an assembly which will align particles on a plane or said median without substantial subsequent disorienting field.

4. The invention as defined in claim 3 wherein there are a plurality of antennae on each section.

* * * * *